UNITED STATES PATENT OFFICE.

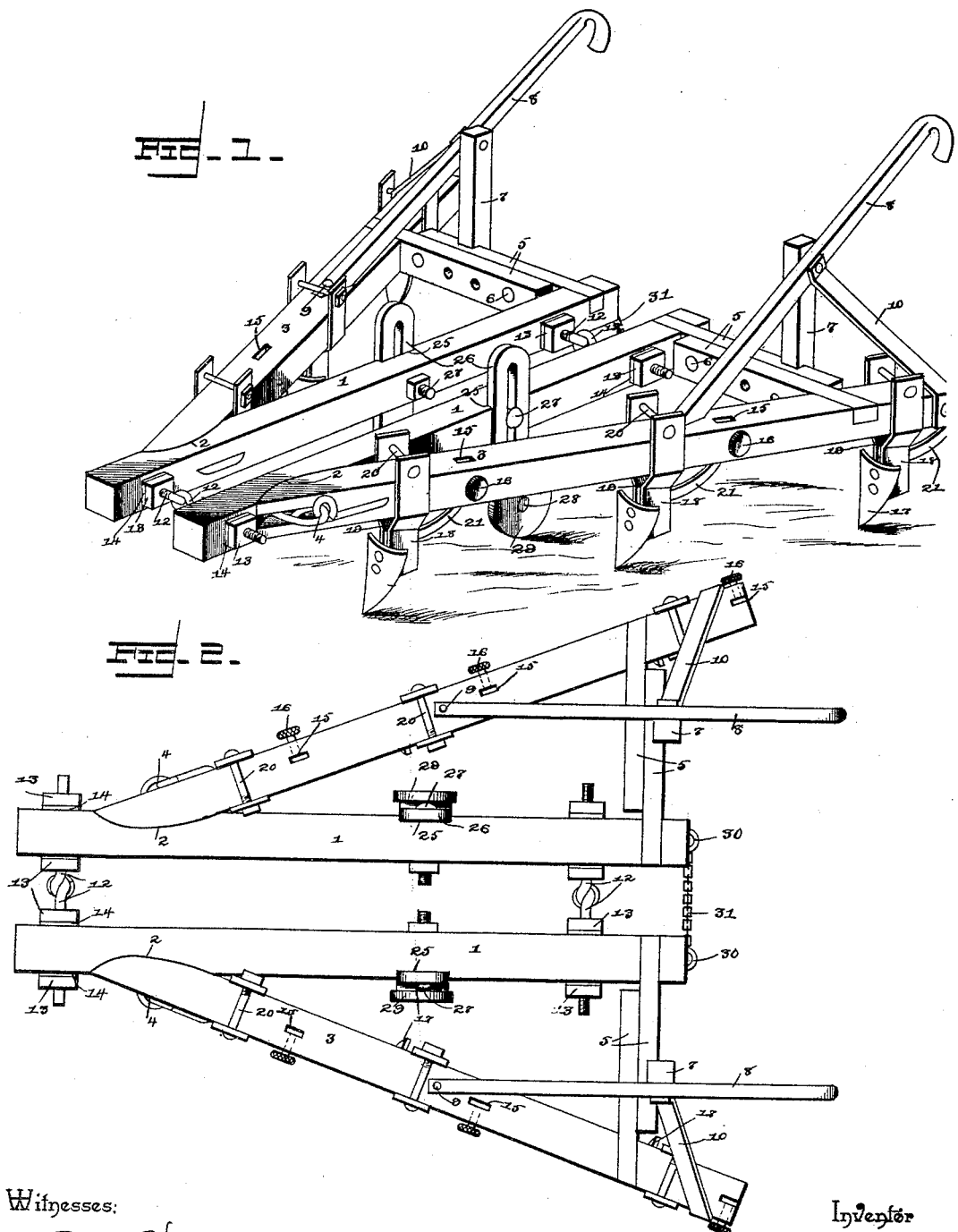

JAMES FRANKLIN NELSON, OF HOMER, LOUISIANA.

CULTIVATOR.

SPECIFICATION forming part of Letters Patent No. 467,995, dated February 2, 1892.

Application filed May 12, 1891. Serial No. 392,438. (No model.)

*To all whom it may concern:*

Be it known that I, JAMES FRANKLIN NELSON, a citizen of the United States, residing at Homer, Claiborne parish, and State of Louisiana, have invented a new and useful Cultivator, of which the following is a specification.

This invention relates to combined harrows and cultivators, the object being to provide a cheap and convenient combined harrow and cultivator capable of being converted from one implement to the other, whereby it is adapted to be used either as a single or double cultivator or as a single or double harrow for cultivating between rows or single rows, and, in fact, manipulating the soil in any of the ways desired and usually performed by the cultivators and harrows of the various classes.

Other objects and advantages of the invention will appear in the following description, and the novel features thereof will be particularly pointed out in the claims.

Referring to the drawings, Figure 1 is a perspective of a cultivator and harrow combined constructed in accordance with my invention. Fig. 2 is a plan of the same.

Like numerals of reference indicate like parts in all the figures of the drawings.

In practicing my invention I construct two sections or frames, each consisting of a central bar or beam 1, the two beams of the frames lying parallel to each other when used in combination. Each beam is provided upon its outer side near its front end with a shallow recess 2, in which loosely fits the curved front end of a pair of side beams 3, which side beams are loosely hinged, as at 4, to their respective central beams and diverge therefrom, as shown. The rear ends of the side beam and the central beam of each section are connected adjustably by means of a pair of overlapping perforated transverse adjusting-bars 5, through which passes an adjusting-pin 6. Standards 7 project from one of each pair of bars 5 and at their upper ends have secured handles 8, the front ends of which are pivoted, as at 9, to their respective side beams. These handles and their standards are braced by inclined diagonal iron braces 10, leading from the handles to the rear ends of the side beams.

Near the front and rear ends the central beams are provided with corresponding perforations, and through each perforation of each central beam passes an eyebolt 12, each pair of eyebolts loosely interlocking at their inner ends, so that the two sections are loosely hinged together at their front and rear ends. Clamping-nuts 13 are mounted upon the eyebolts at each side of each beam 1, and interposed between each nut and the face of the beams are spacing-blocks or washers 14. By means of the clamping-nuts and the washers, which may be increased or decreased in number, it will be obvious that the two frames or sections may be adjusted toward or away from each other to adapt the implement for cultivating different widths of rows. Such connection also permits of the disconnection of the frames, so that either may be used singly, and in passing between narrow places—as, for instance, between two trees, or a tree and a hedge—one section may be folded or swung upon the other.

A series of holes 15 is formed in each of the side beams 3, and into each hole passes a set-bolt 16, adapted to impinge upon the shank of a cultivator or harrow tooth. These harrow-teeth may be removed and ordinary plow-feet substituted. When the plow-feet are substituted, standards 18 embrace the side beams, for which purpose said standards are bifurcated at their upper ends, as at 19, said bifurcations being connected above the beams by means of bolts 20. Braces 21 are connected to the standards, and each brace extends back and into one of the openings 15, where it is held by means of the set-bolt 16. In this manner the openings in the side beams and their adjusting-bolts answer for either harrow-teeth or plow-feet.

In recesses or gains 25, formed in the faces of each of the beams 1, are seated a pair of standards 26, which standards are slotted vertically and adjustable in the same direction by means of bolts 27. The lower ends of the standards are provided with bearing-pins 28, upon which are mounted small wheels 29. By regulating or adjusting these standards the depth of penetration of the harrow-teeth or the plows may be readily regulated.

The manner of operating the above-described implement will be readily understood from the foregoing description, taken in connection with the accompanying drawings, so that a detailed description of the operation further than that heretofore given will be unnecessary.

Each beam is provided at its rear end with a staple 30, the two staples being connected by a loose chain 31.

Having described my invention, what I claim is—

1. In an agricultural implement of the class described, the combination, with the two sections flexibly connected, each comprising an inner longitudinal beam, provided near their front and rear ends with perforations, of eyebolts mounted in the perforations and coupled together in pairs, set-nuts mounted upon each of the eyebolts at each side of the beam through which it passes, and spacing-blocks mounted upon said bolts between the nuts and the beam, substantially as specified.

2. In a harrow or cultivator, a beam provided with a series of oblong openings adapted to receive the shanks of harrow-teeth and provided opposite each opening with a set-bolt adapted to impinge upon said shank, of a series of cultivator-standards bifurcated at their upper ends to embrace the beam, bolts connecting said bifurcations above the beam, and braces connected to each standard and extending back into the oblong opening of the beam, where it is impinged upon by the set-bolt, substantially as specified.

In testimony that I claim the foregoing as my own I have hereto affixed my signature in presence of two witnesses.

JAMES FRANKLIN NELSON.

Witnesses:
O. P. BAILEY,
J. R. RAMSEY.